Jan. 3, 1950   R. C. SABINS   2,493,034
HATCH COVER FASTENER
Filed July 3, 1945
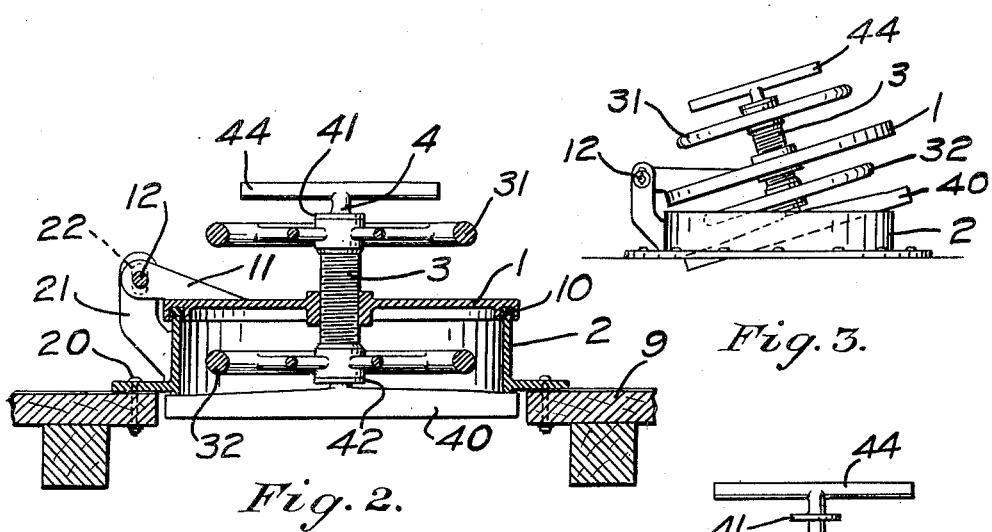
Fig. 3.
Fig. 5.
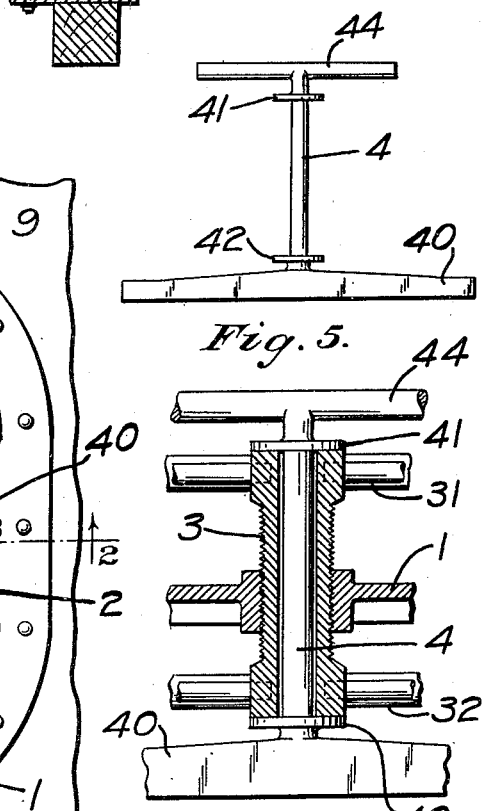
Fig. 2.
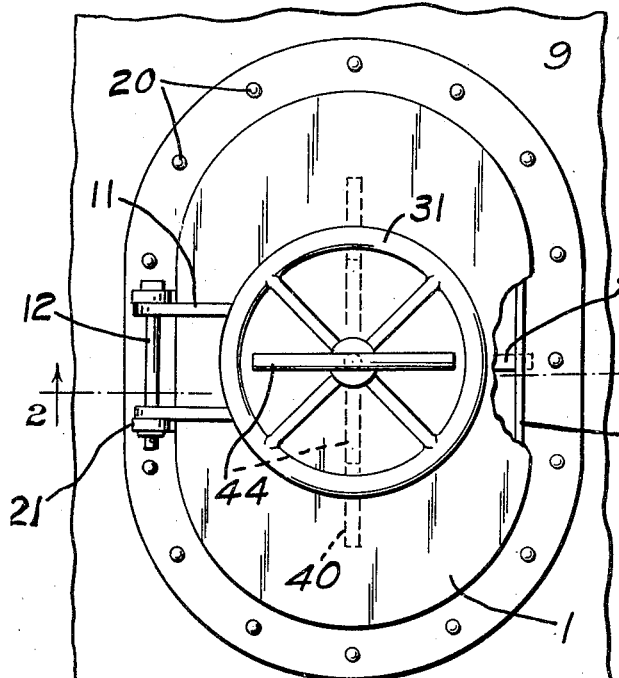
Fig. 1.
Fig. 4.
Inventor
Rolland C. Sabins
By Reynolds & Beach
Attorneys Patented Jan. 3, 1950

2,493,034

UNITED STATES PATENT OFFICE 2,493,034

HATCH COVER FASTENER

Rolland Clifford Sabins, Seattle, Wash.

Application July 3, 1945, Serial No. 602,963

6 Claims. (Cl. 292—260)

The present invention relates to a hatch cover and the associated coaming, for installation upon vessels and in similar places where a hatch or like opening is to be guarded against entrance of water or the like, but which must be opened at other times for ingress and egress. The present invention is particularly designed as a cover for a hatch intended for personnel use, and not as a cover for a cargo hatch.

The normal hatch cover for personnel use is securable and releasable from one side only. This is frequently an inconvenience, but at times may become a positive source of danger, affording the possibility of persons being trapped below deck, for example, or above deck, without the possibility of using the hatch until the hatch cover has been released by a person located at the side where it is secured. However, hatch covers have been thus constructed, notwithstanding such drawbacks, for the reason that it was conceived to be impossible, or at least unduly difficult, to afford any connection through the hatch cover, so that it could be opened from either side, for it would be natural to suppose that such connections would serve only as a source of leakage.

It is, then, a primary object of this invention to provide a hatch cover which affords the possibility of securing and releasing it from above or below, and which yet may be made tight against passage of water from one side to the other.

The invention is particularly adapted for incorporation in a hatch cover which is elongated somewhat in plan shape, and which has, as the below-decks abutment, a crosshead of a length to span the lesser dimension of the hatch coaming, but which, when swung into coincidence with the longer dimension, may pass through the coaming. Since proper securement depends upon determining the exact position of this anchoring member or cross-head, and it cannot be seen when the hatch is being made secure from above, it is a further object to provide means by which one securing the hatch from above may determine precisely the position of the crosshead below the coaming.

It is also an object to provide such a hatch cover, so mounted in relation to its hatch coaming that it may be tilted and held in tilted position for ventilation of the below-decks space in good weather, variable in degree of opening, at will.

A further object is to provide such a hatch cover having the capabilities indicated, which is simple in construction, rugged, and thoroughly reliable in operation, both for water-tight securement and for ready release.

The invention comprises the novel parts, and the novel combination and arrangement thereof, as shown in the accompanying drawings, and as will be more particularly pointed out hereinafter in this specification, and in the claims which terminate the same.

The illustration of the invention in the drawings is a presently preferred form embodied in a deck hatch, but as will be apparent to those skilled in the art, the invention may be otherwise arranged than in a deck, as, for example, in a bulkhead, with appropriate modifications.

Figure 1 is a plan view, with a part broken out, of such a hatch cover in secured position, and Figure 2 is a cross section therethrough along the line indicated by the broken line 2—2.

Figure 3 is an elevation of such a hatch cover in ventilating position.

Figure 4 is an axial section through the securing mechanism.

Figure 5 is an elevation of the central post and associated securing and indicating devices, separate from the remainder of the hatch cover.

The hatch is defined in the deck 9 by a coaming 2, of suitable shape, but preferably somewhat elongated, which is suitably secured to the deck by such means as the bolts 20. Along one of the longer sides of the coaming are the integral pivot brackets 21, formed, as is best shown in Figure 2, with vertically elongated apertures 22 for the reception and limited vertical movement of a pivot rod 12. Such pivot rod joins the pivot brackets 21 and pivot brackets 11 secured upon a cover 1, fitted to rest upon the upper edge of the coaming 2, and having a suitable gasket or sealing means, as indicated at 10 (see Figure 2). The elongated apertures 22 permit sufficient vertical displacement of the cover that the downwardly projecting cover flanges perfecting the seal and receiving between them the coaming and a gasket, with the cover closed will not bind by swinging the cover into or out of that position.

The cover 1 is apertured, in this instance centrally, and tightly threaded in this aperture is an externally threaded hollow sleeve 3. Both above the cover 1 and below the cover there are secured to the sleeve 3 means for rotating the same, such as the upper handwheel 31 and the lower handwheel 32.

Passing through the axial bore of the sleeve or screw 3 is a post 4, which carries at its lower end a spider or crosshead 40, of a length to span the lesser width of the lower edge of the coaming 2, as is clearly shown in Figures 1 and 2 in full lines, but which, when turned to coincide generally with the greater length of the coaming, as shown in dash lines in Figure 1, is of such length that it may readily pass through the coaming as the hatch cover is raised. When it spans the coaming it affords an anchorage or abutment for drawing the cover 1 securely to its seat upon the upper edge of the coaming, and the thrust may be transmitted by means of thrust bearings or flanges on the post 4, such as the upper flange 41 and the lower flange 42. These are spaced apart to receive between them the threaded sleeve 3, and preferably the sleeve should fit fairly snugly between the flanges 41 and 42.

At the upper end of the post 4 is secured an indicator, such as the T-head 44. This parallels the crosshead 40 at the lower end of the post, and thus indicates the disposition of the crosshead, when the latter is invisible by reason of the intervening cover.

Assuming it is desired to secure the cover from above, it is swung down upon the upper edge of the coaming, and by turning the post, through the T-head 44, the crosshead 40 may be disposed to span the lower edge of the coaming. Now by turning the handwheel 31 the screw 3 is rotated, to be drawn upwardly relative to the cover 1, and when the crosshead 40 engages the lower side of the coaming and prevents further upward movement of the screw, the upper end of which bears against the flange 41, further rotation of the screw by the handwheel merely serves to draw the cover 1 tightly to its seat at 10. In so doing the flange 41 is urged upwardly by the upper end of the screw 3, and as a result the joint between them is tightly closed against entrance of water. If the screw is also tightly fitted within the nut in the cover, this threaded aperture through the cover is sealed against entrance of water.

The hatch cover having been secured from above, if one below decks desires to emerge, he may slack off the screw 3 by turning the lower handwheel 32. Obviously one below may secure the hatch cover, and one above may then release it and raise it. It should be pointed out here that the screw engagement typifies a simple and convenient means of drawing the cover and the crosshead toward one another to secure the cover. This is the preferred means of so doing, because in drawing the cover tight the joint with the flange 41 and between the screw threads of the sleeve and of the cover are also drawn tight. However, other means might be employed, and still retain the advantages of securement and release from above or below, at will.

Such a hatch cover is also suited to providing a certain amount of ventilation while still affording some protection. With the hatch cover open, the crosshead 40 may be disposed transversely of the shorter dimension of the coaming, and one end of the crosshead may then be permitted to rest upon the upper edge of the coaming, in the manner shown in Figure 3, which will support the cover 1 in tilted position. The degree of opening may be adjusted as desired by rotating screw 3 by manipulation of either handwheel 31 or 32 to raise or lower the cover relative to the crosshead.

I claim as my invention:

1. Latching mechanism for a cover fitted to close an elongated hatch coaming comprising a hollow screw threaded in and extending through the cover, means on the screw to rotate it, a post extending axially through the screw, and having thrust bearings engaging the screw for conjoint axial movement, a crosshead carried by the lower end of said post, long enough to span the lesser width of the coaming, but short enough to slip through its greater width, and means on the post's upper end to rotate the post to vary the disposition of the crosshead.

2. Latch mechanism for a cover fitted to rest upon a hatch coaming, comprising a post extending through the cover, flanges secured upon said post above and below the cover, respectively, a crosshead carried by said post beneath the lower flange, of a length to span the coaming and adapted to seat against its under side when such crosshead is drawn upwardly, an externally threaded sleeve rotatable about said post between said flanges, and threadedly engaged with the cover, and means to rotate said threaded sleeve to urge its upper end into watertight engagement with the upper flange by drawing said crosshead upwardly into seating engagement with the coaming with the cover closed, and thereby to draw the cover firmly to its seat upon the coaming, or by reverse rotation of the threaded sleeve to urge its lower end against the lower flange to release the cover from its firm seating engagement of the coaming.

3. Latching mechanism for a cover fitted to close a hatch aperture, comprising a screw sleeve threaded through said cover, a post swivelled within said screw, thrust bearing means engageable between the post and each end of the screw sleeve, a crosshead carried by said post and of a length to span the hatch aperture and to engage its margin, at the side opposite the cover's seat upon such hatch aperture, and means to rotate the screw sleeve to seat the cover by reaction from the crosshead by way of the post, the thrust bearing at the side of the cover opposite the crosshead, and the screw sleeve, or to unseat the cover.

4. Latching mechanism for a cover fitted to close a hatch aperture, comprising a screw sleeve threaded through said cover, a post swivelled within said screw, thrust bearing means engageable between the post and each end of the screw sleeve, a crosshead carried by said post and of a length to span the hatch aperture and to engage its margin, at the side opposite the cover's seat upon such hatch aperture, and a hand wheel fast to the screw sleeve, at each side of the cover, whereby by reaction from the crosshead by way of the post, the thrust bearing at the side of the cover opposite the crosshead, and the screw sleeve, to seat the cover, or by reverse reaction to unseat the same.

5. Hatch cover latching mechanism comprising an externally threaded sleeve adapted to extend through the hatch cover in threaded engagement therewith, a post extending through said sleeve to opposite sides of said cover and rotatable therein, separate handle means attached to said sleeve at opposite sides of said cover and movable to rotate said sleeve, a crosshead secured rigidly to one end of said post for rotation thereby and adapted to span the width of the hatch opening to seat against opposite lower edges of the hatch coaming, a member secured to the other end of said post transversely thereof in predetermined angular relationship to said crosshead to indicate the disposition of said crosshead from the corresponding side of the hatch cover and movable to place the crosshead in a desired rotated position, and thrust bearing means at the side of said cover opposite said crosshead and coacting between said sleeve and post to effect endwise displacement of said post by said sleeve moving endwise.

6. Latching mechanism for a hatch cover comprising a sleeve extending completely through the cover, handles on said sleeve one at each side of the cover, either of which handles may be grasped to rotate the sleeve, a sleeve supporting member carried by the cover through which said sleeve extends uninterruptedly, a post member extending through the hollow of said sleeve, said sleeve having a threaded connection with one of said members and a rotative and thrust bearing connection with the other of said members to effect nonrotative movement of said post member lengthwise thereof relative to the cover by rotation of said sleeve, and a crosshead carried by said post member and movable by such lengthwise movement thereof effected by rotation of said sleeve, to draw said crosshead into cover-locked position or to shift it from such locking position into cover-releasing position.

ROLLAND CLIFFORD SABINS.

REFERENCES CITED

The following references are of record in the file of this patent:

UNITED STATES PATENTS

| Number | Name | Date |
|---|---|---|
| 458,525 | Farlow | Aug. 25, 1891 |
| 879,137 | Barclay et al. | Feb. 18, 1908 |
| 1,092,260 | Hiser | Apr. 7, 1914 |
| 1,215,905 | Burke et al. | Feb. 13, 1917 |
| 1,300,633 | Miller | Apr. 15, 1919 |
| 2,323,238 | Phillips | June 29, 1943 |

FOREIGN PATENTS

| Number | Country | Date |
|---|---|---|
| 10,419 | France | July 3, 1909 |
| 59,355 | Sweden | Aug. 11, 1925 |